UNITED STATES PATENT OFFICE.

JOHN W. HYATT AND ISAIAH S. HYATT, OF NEWARK, N. J., ASSIGNORS TO THE CELLULOID MANUFACTURING COMPANY, OF NEW YORK, N. Y.

IMPROVEMENT IN FACTITIOUS IVORY.

Specification forming part of Letters Patent No. 156,354, dated October 27, 1874; application filed October 13, 1874.

*To all whom it may concern:*

Be it known that we, JOHN W. HYATT and ISAIAH SMITH HYATT, of Newark, in the county of Essex and State of New Jersey, have invented an Improvement in Factitious Ivory, of which the following is a specification:

Heretofore ivory or bone dust, or similar materials, have been agglutinated into a solid with collodion or shellac. In the solid thus formed the particles of ivory-dust do not disappear as particles, nor combine with the cement, but remain distinct, and give to the compound a granular appearance. This is due to the fact that the solvents of nitro-cellulose used in the production of collodion do not act as solvents of the ivory-dust.

The principal solvent of nitro-cellulose is sulphuric ether, to which is added from ten to fifteen per cent. of alcohol. A strong solution of gum-camphor in alcohol is also sometimes used as a solvent of nitro-cellulose in the production of collodion; but neither these or other well-known solvents of nitro-cellulose are solvents of ivory or bone dust.

The collodion does not adhere to these particles with sufficient tenacity to prevent their separating to some extent during any operation of cutting or polishing to which the compound may be subjected, on which account it cannot easily be given a finely-polished surface; neither is the compound so strong nor tenacious as it would be if the particles of dust and collodion were perfectly united.

Our present invention overcomes these objections by softening or semi-dissolving ivory-dust with an agent which combines with the adhesive material, so that, by intimately mixing this prepared ivory or bone dust, or similar material, with the adhesive materials, they blend or coalesce, and form a permanent and homogeneous combination, in which the ivory no longer exists in the form of dust, and the particles cannot be distinguished. This is effected in the following manner:

We take, say, one hundred parts by weight of ivory-dust, one hundred parts of pyroxyline, (by which term we mean soluble nitro-cellulose,) and fifty parts of powdered gum-camphor. The pyroxyline is ground into a pulp while moist, and it is afterward deprived of nearly all of its moisture, leaving it slightly damp, as a protection against its taking fire from any cause. It is thoroughly mixed with the ivory-dust and gum-camphor, in the proportions just named. These ingredients may be advantageously intermixed in a Bogardus mill. After being mixed the mass is deprived of all remaining aqueous moisture, preferably by pressure between absorbing-pads, according to the method described in our Letters Patent No. 133,229, issued November 19, 1872. To this compound, deprived of moisture, we then add fifty parts of nitric ether, and keep the whole within a closed vessel for several hours, or until the nitric ether has become evenly and thoroughly diffused throughout the mass.

The nitric ether permeates and semi-dissolves the ivory-dust, the camphor, and the pyroxyline, and thus properly disposes them for final treatment, which consists in bringing the whole compound together into a solid within a heated cylinder or molds under heavy pressure, or by passing it through heated rollers. From 150° to 250° Fahrenheit of heat is required. The result is a compound which, after being dried or seasoned, resembles natural ivory in compactness and homogeneousness. It is free from grain, is not affected by moisture, and is with great facility remolded into any desired form by heat and pressure in suitable molds.

This compound may also be formed by a preliminary and separate transformation of each of the principal ingredients, viz., ivory-dust and pyroxyline, and their subsequent transformation as follows: First place the ivory or bone dust and nitric ether together in a closed vessel, and let them remain until the nitric ether has permeated and softened or semi-dissolved the ivory-dust. At the same time separately transform the pyroxyline into collodion by treatment with any of its known solvents. Then combine the prepared ivory-dust with the collodion by masticating them together between rollers, preferably heated.

For most purposes the first-described plan is the better.

The proportions of ingredients above set forth may be considerably varied to suit the consistency required and the use to which the new compound is to be adapted.

To the mixture may be added such pigments as are appropriate to the production of various colors.

We claim as our invention—

1. The process herein described of making factitious ivory, by combining ivory or bone dust, pyroxyline, and powdered camphor, in about the proportions named, and adding to the mass nitric ether, to form a homogeneous mass.

2. As a new article of manufacture, factitious ivory, composed of ivory or bone dust, pyroxyline, and a mutual solvent, formed into a homogeneous mass, substantially as hereinbefore set forth.

Signed by us this 7th day of October, A. D. 1874.

JOHN W. HYATT.
I. SMITH HYATT.

Witnesses:
MURRAY LIVINGSTON,
OSCAR L. LEFFERTS.